(12) United States Patent
Tamura et al.

(10) Patent No.: US 7,445,097 B2
(45) Date of Patent: Nov. 4, 2008

(54) CRASH ENERGY ABSORPTION MEMBER

(75) Inventors: Kenji Tamura, Takatsuki (JP); Yoshiaki Nakazawa, Takarazuka (JP); Michitaka Yoshida, Amagasaki (JP); Katsutoshi Takagi, Aichi (JP); Mitsutoshi Kano, Toyota (JP)

(73) Assignees: Sumitomo Metal Industries, Ltd., Osaka (JP); Toyoda Iron Works Co., Ltd., Aichi (JP)

( * ) Notice: Subject to any disclaimer, the term of this patent is extended or adjusted under 35 U.S.C. 154(b) by 84 days.

(21) Appl. No.: 11/340,651

(22) Filed: Jan. 27, 2006

(65) Prior Publication Data
US 2006/0181072 A1    Aug. 17, 2006

Related U.S. Application Data

(63) Continuation of application No. PCT/JP2004/011117, filed on Jul. 28, 2004.

(30) Foreign Application Priority Data
Jul. 28, 2003    (JP) .............................. 2003-280950

(51) Int. Cl.
*F16F 7/12* (2006.01)
(52) U.S. Cl. ...................... 188/377; 293/133
(58) Field of Classification Search ................ 188/371, 188/377; 267/139; 280/784; 138/177, 178, 138/DIG. 11; 293/133; 296/187.03, 187.09, 296/187.11
See application file for complete search history.

(56) References Cited

U.S. PATENT DOCUMENTS

| | | | | |
|---|---|---|---|---|
| 4,227,593 A | * | 10/1980 | Bricmont et al. | ............. 188/377 |
| 5,314,229 A | * | 5/1994 | Matuzawa et al. | ..... 296/187.09 |
| 5,419,416 A | * | 5/1995 | Miyashita et al. | ............ 188/371 |
| 6,588,830 B1 | * | 7/2003 | Schmidt et al. | ......... 296/187.09 |
| 2002/0153719 A1 | * | 10/2002 | Taguchi | ...................... 280/784 |

FOREIGN PATENT DOCUMENTS

| DE | 195 17 922 | 11/1996 |
|---|---|---|
| JP | 50-008973 | 1/1975 |
| JP | 05-139242 | 6/1993 |
| JP | 06-123323 | 5/1994 |
| JP | 06-264949 | 9/1994 |
| JP | 08-128487 | 5/1996 |
| JP | 09-277953 | 10/1997 |
| JP | 2001-354197 | 12/2001 |
| JP | 2002-139086 | 5/2002 |
| JP | 2002-316642 | 10/2002 |

* cited by examiner

*Primary Examiner*—Robert A. Siconolfi
*Assistant Examiner*—Vu Q Nguyen
(74) *Attorney, Agent, or Firm*—Clark & Brody

(57) ABSTRACT

A crash energy absorption member capable of reducing the initial load without provision of a crushing bead and capable of achieving a sufficient amount of shock absorption with stable buckling behavior. The crash energy absorption member is formed from a tubular body which has a length L and a polygonal transverse cross-sectional shape with 2n corners due to having 2n ridge lines (wherein n is a natural number greater than or equal to 3) and 2n surfaces partitioned by these 2n ridge lines, and which absorbs impact energy by buckling when an impact load is applied to one end in the axial direction towards the other end, characterized in that some of the 2n ridge lines only exist in a region which extends from a position spaced by a distance h in the axial direction from the one end to the other end, and if the number of the remaining ridge lines which have a length L is m, the following equations are satisfied:

$$h \leq L \times 0.30 \qquad (1)$$

$$4 \leq m \leq 2 \times (n-1). \qquad (2)$$

11 Claims, 5 Drawing Sheets

CRASH ENERGY ABSORPTION MEMBER

CROSS REFERENCES TO RELATED APPLICATIONS

This application is a continuation of International Patent Application No. PCT/JP2004/011117, filed Jul. 28, 2004. This PCT application was not in English as published under PCT Article 21(2).

TECHNICAL FIELD

This invention relates to a crash energy absorption member. Specifically, this invention relates to a crash energy absorption member which can absorb impact energy which is generated at the time of a collision of a vehicle such as an automobile.

BACKGROUND ART

As is well known, at present, the bodies of many automobiles are monocoque bodies in which a load is supported by the overall body which is integral with a frame in order to achieve both a decrease in weight and high stiffness. The body of an automobile must be able to suppress impairment of the functions of the vehicle at the time of a collision of the vehicle and protect the lives of passengers within a passenger cabin. In order to decrease damage to a passenger cabin by absorbing the energy of impact at the time of a collision of a vehicle and reduce the impact force to the passenger cabin, it is advantageous to preferentially crush spaces other than the passenger cabin, such as the engine compartment or the trunk.

On account of such safety demands, crash energy absorption members which actively absorb impact energy by collapsing when an impact load is applied at the time of a collision are provided in suitable locations, such as at the front, the rear, or the side of a vehicle. Examples of such crash energy absorption members are cross side members, side sills, and rear side members.

In recent years, it has been attempted to increase the safety of vehicles and to reduce repair costs by nearly eliminating damage to vehicles caused by light impacts by mounting a crash energy absorption member referred to as a crush box on the front end of a front side member by a suitable means such as coupling with a mechanical connector or welding. A crush box is a member which absorbs impact energy by preferentially buckling in the axial direction into the shape of a bellows (or accordion) under an impact load which is applied in the axial direction.

Various materials and shapes have thus far been developed for increasing the crash energy absorbing performance of such a crash energy absorption member. The crash energy absorbing performance which is demanded of a crash energy absorption member are, specifically, that it deform into a bellows shape by repeatedly stably buckling in the axial direction when an impact load is applied in the axial direction, that the average load be high at the time of collapse of the crash energy absorption member, and that the maximum reaction force which is generated upon the collapse of the crash energy absorption member be within a range which does not cause damage to other members disposed in the vicinity of the crash energy absorption member.

Up to now, crash energy absorption members which have generally been used have been box-shaped members welded to a backing plate by means of a flange provided on a member having a hat-shaped transverse cross-sectional shape like that disclosed in JP-A 08-128487, for example. In this specification, "flange" means an edge portion which projects outwards from an outline of a transverse cross section.

As a different type, in JP-A 09-277953, a crash energy absorption member is disclosed which decreases the load at the initial stage of a collision and increases the absorbed impact by having a closed cross-sectional structure such that the transverse cross-sectional shape continuously changes from one end towards the other end from a polygon having at least 4 sides to a polygon having a larger number of sides. It is disclosed in JP-A 09-277953 that the initial load becomes too large when the transverse cross-sectional shape of the crash energy absorption member is made a simple polygon.

JP-A 2002-316642 discloses a crash energy absorption member in which a notch is formed in one of the left and right sides or in one of the upper and lower sides at the front end of a prismatic crash energy absorption member having four flat surface portions.

JP-A 2002-139086 discloses a crash energy absorption member in which the maximum load is decreased by providing a crushing bead.

Air bags which in recent years have been mounted on many automobiles as a passenger protection apparatus must start operating with an accurate timing an extremely short period of time after a collision in order to decrease injury to passengers due to the collision. An air bag starts operating in response to a signal which is output based on a change in the impact load which is sensed at the time of a collision by an acceleration sensor mounted on a crash energy absorption member such as a front side member. If the amount of change in the impact load acting on a crash energy absorption member at the time of a collision is not obtained in a stable manner, the output timing of the signal fluctuates, and the air bag can no longer accurately start operating with a desired timing.

JP-A 05-139242 discloses a crash energy absorption member in which a difference is provided in the plate thickness of the front portion and the rear portion of the crash energy absorption member, a step portion is provided between the front portion and the rear portion of the crash energy absorption member so as to produce a difference in cross-sectional area, or a reinforcing member is provided to the rear of the step portion, whereby the impact load is controlled so that the impact load which is absorbed by the crash energy absorption member is divided into two stages. As a result, the energy of a collision is adequately absorbed, and an acceleration sensor can accurately operate at a value close to a set acceleration.

DISCLOSURE OF THE INVENTION

However, with any of the inventions disclosed in the past in JP-A 08-128487, JP-A 09-277953, JP-A 2002-316642, and JP-A 2002-139086, it is not possible to provide a crash energy absorption member which can secure a prescribed amount of shock absorption by stable buckling in the axial direction without an increase in weight due to the addition of a partition or an increase in plate thickness.

In the invention disclosed in JP-A 09-277953, the transverse cross-sectional shape of a crash energy absorption member gradually changes over roughly its entire length. Therefore, it is thought that that invention can in fact decrease the initial load. However, depending upon the position in the axial direction of the crash energy absorption member, there is the possibility of the transverse cross-sectional shape of the crash energy absorption member unavoidably becoming a shape which is not suitable for stable buckling. Accordingly, when an impact load is applied in the axial direction to that crash energy absorption member, it cannot stably undergo repeated buckling in the axial direction, and it may not be able to deform into a bellows shape.

In the invention disclosed in JP-A 2002-316642, the front end portion of a member has a asymmetric shape. Therefore, the behavior during collapse of a single crash energy absorption member becomes asymmetric, bending or the like may occur during collapse, and stable buckling may not be possible.

In the invention disclosed in JP-A 2002-139086, a suitable location for the provision of a crushing bead varies with the shape, the dimensions, the material and the like of the crash energy absorption member. Therefore, in order to determine the position for providing the crushing bead in that invention, it is necessary to experimentally prepare crash energy absorption members having crushing beads in various locations and to carry out a considerable number of verifying tests. As a result, that invention cannot actually be easily put into practice.

The invention disclosed in JP-A 05-139242 controls a load by providing a difference in plate thickness or a step in various portions of a crash energy absorption member to impart a difference in cross-sectional area. Therefore, in that invention, the portions where the difference in plate thickness or the difference in cross-sectional area is provided are subject to a great influence by the behavior in deformation at the time of buckling, and the load difference which is produced and the stroke which is produced by this load difference easily fluctuate. As a result, in that invention it is not easy to stably control the impact load with certainty in such a manner that the impact load which is absorbed by the crash energy absorption member at the time of a collision is divided into two stages.

In addition, that invention unavoidably causes an increase in the weight of the crash energy absorption member, so it is contrary to the demand for weight reduction of vehicle bodies, and the cost of the crash energy absorption member increases.

An object of the present invention is to provide a crash energy absorption member which can secure a prescribed amount of shock absorption by stably buckling in the axial direction into the shape of a bellows when an impact load is applied thereto without an increase in weight due to the addition of a partition or an increase in plate thickness and without causing bending in the axial direction.

Another object of the present invention is to provide a crash energy absorption member which can stably control an impact load with certainty by dividing the impact load which is absorbed by the crash energy absorption member at the time of a collision into two stages without causing an increase in the weight of the crash energy absorption member.

As a result of various studies in light of the problems of the above-described prior art, the present inventors found that by giving a crash energy absorption member a prescribed shape, even if a crushing bead is not provided, an increase in the initial load can be suppressed and stable buckling behavior can be exhibited, and a level of shock absorption in accordance with a design target can be secured. Here, the initial load means the first maximum value of the load which occurs at the initial stage of collapse.

The present inventors carried out analysis by FEM of axial collapse of a crash energy absorption member. As a result, it was ascertained that the load and the absorbed energy EA both increase as the number of sides in a polygonal transverse cross-sectional shape of a crash energy absorption member increases from a quadrilateral to a hexagon and then to an octagon.

Figure 1A:
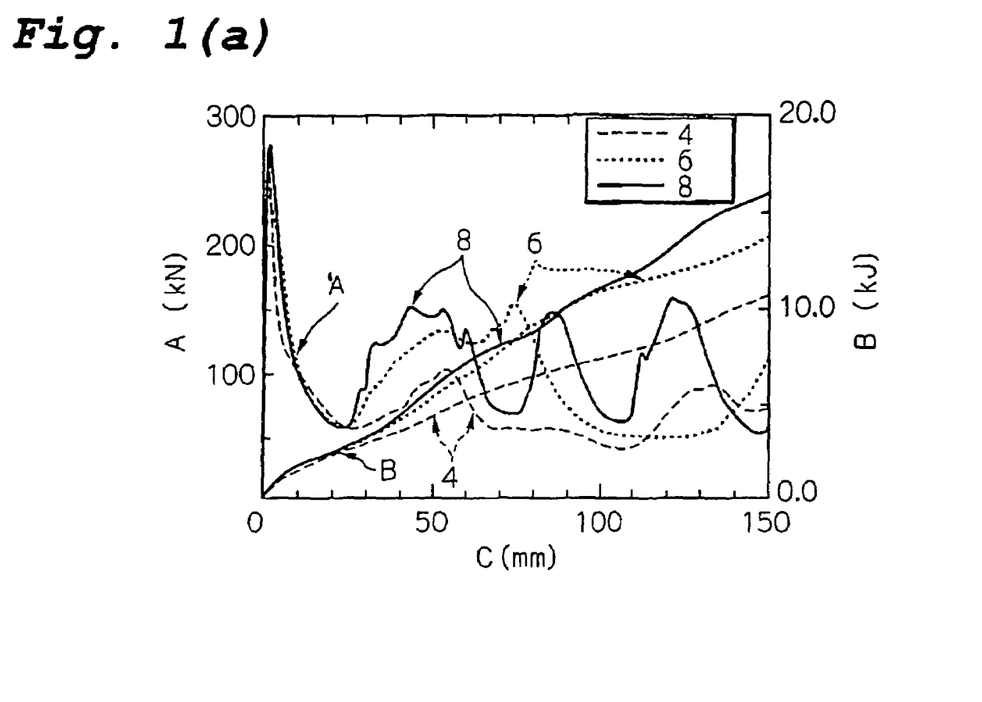
FIG. 1(a) is a graph showing the load when the displacement is in the range of 0-150 mm.
Figure 1B:
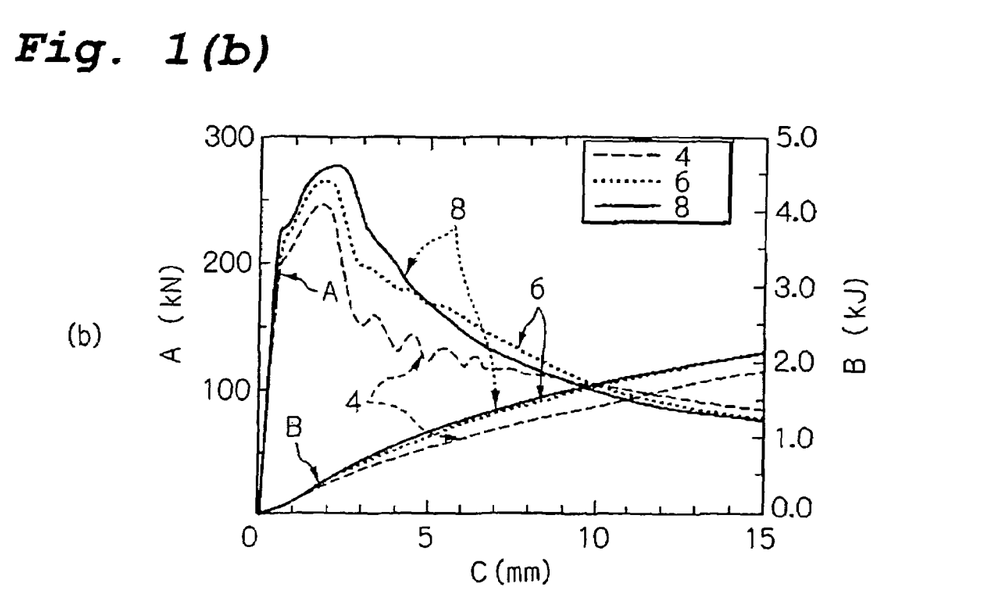
FIG. 1(b) is a graph showing an enlargement of the region of FIG. 1(a) where the displacement is in the range of 0-15 mm.

FIG. 1(a) is a graph showing the load when the displacement is in the range of 0-150 mm, and FIG. 1(b) is an enlarged view of the region in FIG. 1(a) in which the displacement is in the range of 0-15 mm.

In FIG. 1(a) and FIG. 1(b), ordinate A indicates the load, ordinate B indicates the absorbed energy, and the abscissa C indicates the amount of displacement. The numbers 4, 6, and 8 next to lead lines in the graphs of FIG. 1(a) and FIG. 1(b) indicate a quadrilateral, a hexagon, and an octagon, respectively. Symbol A next to a lead line in the graphs of FIG. 1(a) and FIG. 1(b) indicates curves showing the load, and symbol B next to a lead line indicates curves showing the absorbed energy.

From the graphs shown in FIG. 1(a) and FIG. 1(b), it can be seen that in order to secure a prescribed amount of shock absorption, it is preferable to make the transverse cross-sectional shape of a crash energy absorption member a polygon with 6 or more sides.

As can be seen from this graph, as the transverse cross-sectional shape of a crash energy absorption member increases from a quadrilateral to a hexagon and then to an octagon, there is the problem that the initial load increases.

Accordingly, in order to make it possible to actually use a crash energy absorption member having a polygonal transverse cross-sectional shape with 6 or more sides, it is important to decrease the initial load while maintaining the inherent buckling behavior of the crash energy absorption member. In general, the initial load which is applied to a crash energy absorption member which is made to collapse in the axial direction is proportional to the product of the cross-sectional area of the crash energy absorption member at a position in the axial direction where initial buckling occurs and the yield stress of the material constituting the crash energy absorption member.

Therefore, in order to decrease the initial load when forming a crash energy absorption member of a given material it is effective to decrease the transverse cross-sectional area of the crash energy absorption member at the time of occurrence of initial buckling.

The present inventors performed further investigations based on these findings, and as a result, they found that by forming notches, preferably symmetrically, in a portion of a tubular body of a crash energy absorption member on the side to which an impact load is applied, the initial load can be decreased while the stability of the buckling behavior of the crash energy absorption member is maintained.

It occurred to the present inventors thought that if the shape of these notches is optimally set, stepwise control of the impact load which is absorbed by the crash energy absorption member at the time of collision can be stably realized with certainty, and as a result, the above-mentioned acceleration sensor can be operated with certainty, so they performed further investigations.

As a result, they made the findings listed below.

Figure 2:
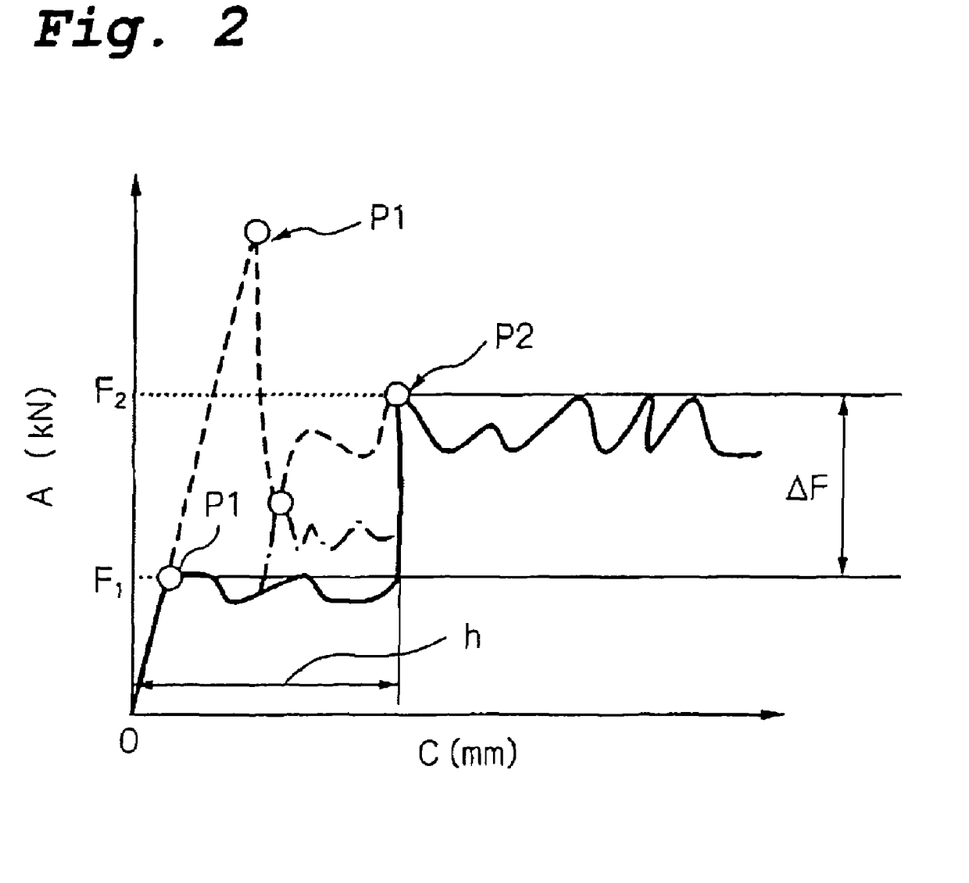
FIG. 2 is a graph showing one example of the relationship between the displacement (stroke) and load during axial collapse of a crash energy absorption member having a portion of a ridge line cut out by a notch.

(a) One example of the relationship between the displacement (stroke) and the load during axial collapse of a crash energy absorption member having a portion of a ridge line cut out by a notch is shown by the graph in FIG. 2. The ordinate A in FIG. 2 shows the load, and the abscissa C shows the amount of displacement.

As shown by the solid line in the graph of FIG. 2, if a portion of a ridge line is cut out by providing a notch, compared to the case in which a notch is not provided (shown by a dashed line), two-stage load characteristics clearly having a first stage peak load $F_1$ and a second stage peak load $F_2$ are obtained. By utilizing these two peak loads $F_1$ and $F_2$, the impact load absorbed by a crash energy absorption member at the time of a collision is divided into two stages, the impact load can be stably controlled with certainty, and as a result, an acceleration sensor can be made to operate with certainty.

(b) A crash energy absorption member has a polygonal transverse cross-sectional shape with 2n corners due to having 2n ridge lines (wherein n is a natural number greater than or equal to 3) and 2n surfaces separated by these 2n ridge lines, its length in the axial direction is L, some of the 2n ridge lines exists only in a region extending between a position at a distance h in the axial direction from one end to which an impact load is applied and the other end, and the number of ridge lines of length L not having a cutout is m.

In the graph of FIG. 2, the load difference $\Delta F$ between the first stage peak load $F_1$ and the second stage peak load $F_2$ varies with the number of ridge lines having a cutout (2n-m) or the number of ridge lines not having a cutout (m). Accordingly, by controlling the number of ridge lines cut out by a notch (2n-m) or the number of ridge lines which are not cut out (m), the load difference $\Delta F$ can be suitably controlled in accordance with the characteristics (the vehicle weight, the load characteristics, the acceleration characteristics, and the like) of the vehicle of interest. As a result, optimal tuning in accordance with the sensitivity of the acceleration sensor of the vehicle of interest can be easily carried out.

(c) By changing the depth h of the notches in accordance with their locations in the circumferential direction of the tubular body, i.e., by forming a plurality of types of notches having differing depths h, as shown by the dot and dash line in the graph of FIG. 2, in the same manner as described above, peak load characteristics having a plurality of stages are easily obtained, and these characteristics can be extremely effectively utilized not only for an acceleration sensor for an air bag but also for operational control of various sensors used in complicated vehicle systems such as for side air bags or pretensioned seat belts.

The load characteristics due to the provision of these notches can be controlled entirely by the characteristics of the notches without any addition of a new member such as a reinforcing member. Therefore, depending on the characteristics of the notches, a crash energy absorption member which can exhibit a predetermined load difference can be obtained with certainty without producing an increase in weight.

Due to this load difference, the energy absorbed by the crash energy absorption member is decreased. However, in the present invention, this step-wise load change is produced in the initial stage of deformation, so the influence on the energy absorbed over the entire range of deformation is small, and the impact properties which are obtained are enormously improved compared to the example disclosed in JP-A 05-139242.

The present invention was achieved based on these new and important findings concerning a crash energy absorption member.

The present invention is a crash energy absorption member formed from a tubular body which has a length L and a polygonal transverse cross-sectional shape with 2n corners due to having 2n ridge lines (wherein n is a natural number greater than or equal to 3) and 2n surfaces partitioned by these 2n ridge lines, and which absorbs impact energy by buckling when it receives an impact load directed from one end in the axial direction towards the other end, characterized in that some of the 2n ridge lines only exist in a region which extends from a position spaced by a distance h in the axial direction from the one end to the other end, and if the number of the remaining ridge lines which have a length L is m, the following equations are satisfied.

$$h \leq L \times 0.30 \quad (1)$$

$$4 \leq m \leq 2 \times (n-1) \quad (2)$$

In a crash energy absorption member according to the present invention preferably the following apply: (i) $h \geq L \times 0.03$, (ii) $0.30 \leq m/2n \leq 0.70$, (iii) the regions are formed in a step-wise manner with at least 2 steps in the axial direction, and (iv) the tubular body has a shape which is symmetric with respect lo to the central axis of the tubular body.

BEST MODES FOR CARRYING OUT THE INVENTION

Next, best modes for carrying out the present invention will be explained in detail while referring to the attached drawings.

Figure 3A:
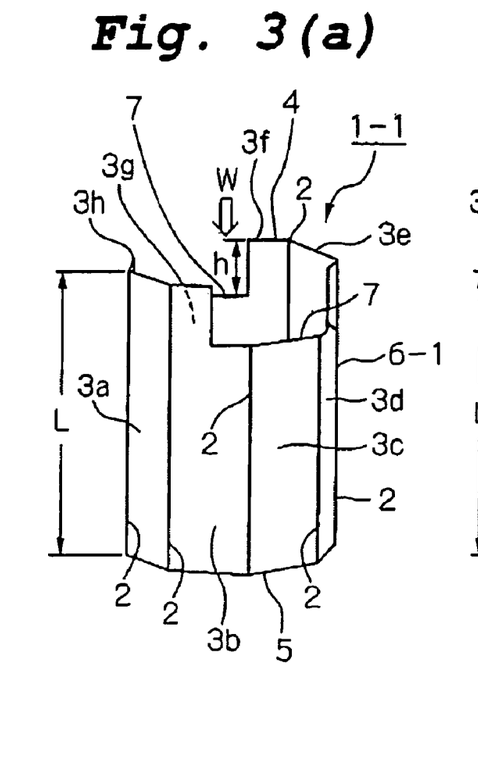
FIG. 3(a) and FIG. 3(b) are schematic perspective views showing an embodiment of a crash energy absorption member having an octagonal transverse cross-sectional shape and an overall length of L.
Figure 3B:
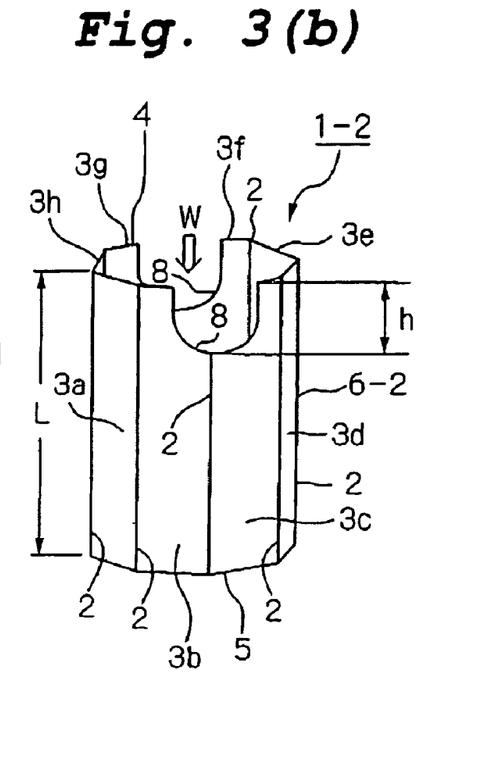

FIG. 3(a) and FIG. 3(b) are schematic perspective views showing embodiments of crash energy absorption members 1-1 and 1-2, respectively, having an octagonal transverse cross-sectional shape and a length L.

As shown in FIG. 3(a) and FIG. 3(b), the crash energy absorption members 1-1 and 1-2 of this embodiment both comprise tubular bodies 6-1 and 6-2 having a length L.

Each of the tubular bodies 6-1 and 6-2 has 2n ridge lines 2 (in this example, n=4, so there are 8 ridge lines), and 8 flat surfaces 3a, 3b, 3c, 3d, 3e, 3f, 3g, and 3h which are partitioned by these 8 ridge lines 2, whereby an octagonal transverse cross-sectional shape is obtained.

In the present invention, by making the cross-sectional shapes of the tubular bodies 6-1 and 6-2 shapes having 2n sides wherein 2n is at least 6, as was explained while referring to the graph of FIG. 1, sufficient energy absorption can be achieved and symmetry of the tubular bodies 6-1 and 6-2 can be easily maintained, whereby stable buckling is secured.

In addition, when an impact load W shown by the hollow arrows is applied to one end 4 in the axial direction (in the vertical direction in FIG. 3(a) and FIG. 3(b)) towards the other end 5 separated by a distance L, the tubular bodies 6-1 and 6-2 absorb impact energy by buckling in the axial direction into the shape of a bellows.

In the crash energy absorption member 1-1 shown in FIG. 3(a), in some of the 8 ridge lines, regions encompassing the respective ridge lines and extending circumferentially to pass over the surface 3b, 3c, 3d, 3f, 3g, or 3h entirely or partly exist only from a position at a distance h in the axial direction from the one end 4 to which an impact load W is applied up to the other end 5. As a result, two notches 7 having a generally rectangular shape are formed to a maximum depth h at the one end portion 4 of the tubular body 6-1.

In the crash energy absorption member 1-2 shown in FIG. 3(b), the length in the axial direction of surfaces 3b, 3c, 3f, and 3g varies in the circumferential direction in the range from L to (L-h). As a result, two semicircular notches 8 having a maximum depth of h are formed at the one end portion 4 of this tubular body 6-2.

In this embodiment, if the number of ridge lines having a length L, i.e., 25 the number of ridge lines which are not cut out by forming notches 7 and 8 in tubular bodies 6-1 and 6-2 is m, then the relationships $$h \leq L \times 0.30 \quad (1)$$

$$4 \leq m \leq 2 \times (n-1) \quad (2)$$

$$h \geq L \times 0.03 \quad (3)$$

are satisfied. These relationships will be explained below.

In this embodiment, the reason for providing notches 7 and 8 is in order to decrease the initial load during a collision, so notches 7 and 8 are provided so as to include a portion of the ridge lines 2 of tubular bodies 6-1 and 6-2.

Figure 4:
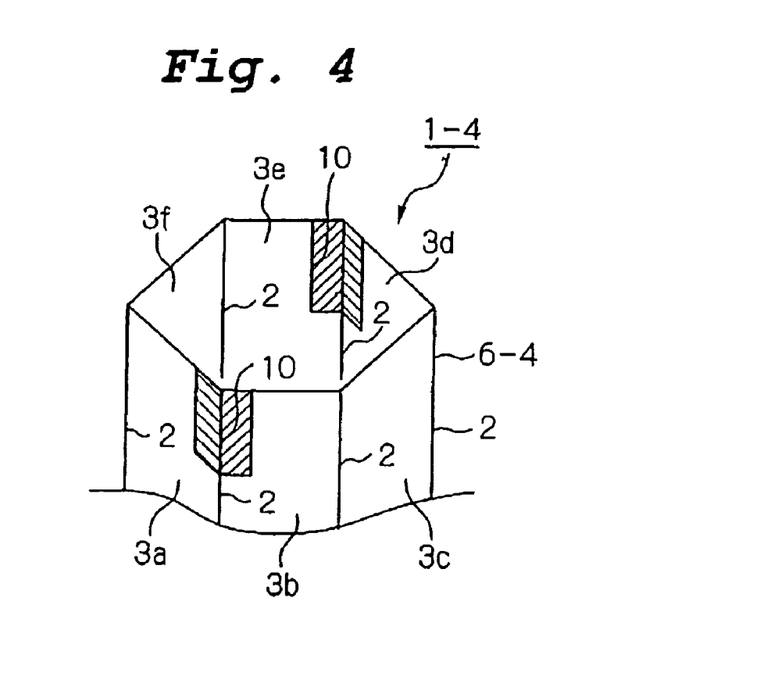
FIG. 4 is a schematic perspective view showing an embodiment of a crash energy absorption member having a transverse cross-sectional shape other than an octagon.

In contrast to the examples shown in FIG. 3(a) and FIG. 3(b), notches 10 may be provided in the positions shown in FIG. 4, for example.

FIG. 4 shows an example in which a portion of adjacent two surfaces 3a, 3b and 3d, 3e which interpose a ridge line therebetween 2 are cut out to form notches 10. In FIG. 4, notches 10 are shown by hatching.

The example shown in FIG. 3(a) and the example shown in FIG. 4 both have notches 7 and 10 provided in the direction parallel to the axial direction of tubular bodies 6-1 and 6-4, and the bottom portions of the notches 7 and 10 are straight. As shown in FIG. 3(b), the notches 8 are the same in that they are formed in a direction parallel to the axial direction of tubular body 6-2, but the bottom portions of the notches 8 may be formed as a curve.

Many variations in addition to the above are conceivable for the shape of the notches, and as long as the shape is one which can reduce the initial load at the time of a collision, these variations are included in the scope of the present invention.

In the crash energy absorption members 1-1 and 1-2 of this embodiment, firstly, the initial load at the time of impact is greatly decreased by providing notches 7 and 8 in a portion of one end portion 4 of tubular bodies 6-1 and 6-2. Secondly, in the crash energy absorption members 1-1 and 1-2 of this embodiment, an amount of the absorbed impact energy is secured by limiting the length h of the notches 7 and 8 in the axial direction to a prescribed range.

In this embodiment, the shapes of the notches 7 and 8 are prescribed in the above-described manner in order to achieve a decrease in initial load and to stabilize collapse behavior.

With respect to the region in which the distance h in the axial direction from the one end 4 to which an impact load W is applied is $0 < h \leq (L \times 0.30)$, the length of m ridge lines 2 ($4 \leq m \leq \{2 \times (n-1)\}$) remains to be L (with no cutout), and the length of the other ridge lines 2 is made (L-h) due to the provision of notches 7 and 8.

If the number m is less than 4, although the initial load can be suppressed to a low value, the load increases at the time of the second occurrence of buckling, and the effect of decreasing the maximum load during overall collapse displacement is not obtained.

If the length h of the notches 7 and 8 in the axial direction exceeds (L×0.30), bending of the member develops during deformation at the time of collapse of the remaining portions of the member which do not have notches, and the buckling behavior of the crash energy absorption member as a whole becomes unstable.

The length h of the notches 7 and 8 in the axial direction is preferably at least (L×0.03). If the length h is less than (L×0.03), the effect of decreasing the initial load decreases. From the same standpoint, the length h is more preferably at least (L×0.05) and at most (L×0.20).

The m ridge lines 2 which remain with a length of L may continuously adjoin each other in the circumferential direction of the tubular bodies 6-1 and 6-2, or they may be intermittently positioned without adjoining each other.

In the crash energy absorption members 1-1 and 1-2 of this embodiment, the relationship $0.30 \leq m/2n \leq 0.70$ is satisfied. By limiting the ratio of the number m of ridge lines remaining with a length L (or conversely, the number (2n-m) of ridge lines with cutouts) to the total number 2n of ridge lines to a range of at least 0.30 and at most 0.70, a suitable load difference for the acceleration sensor for outputting a start signal for an air bag is easily obtained, and the amount of absorbed impact energy can be increased.

Figure 5:
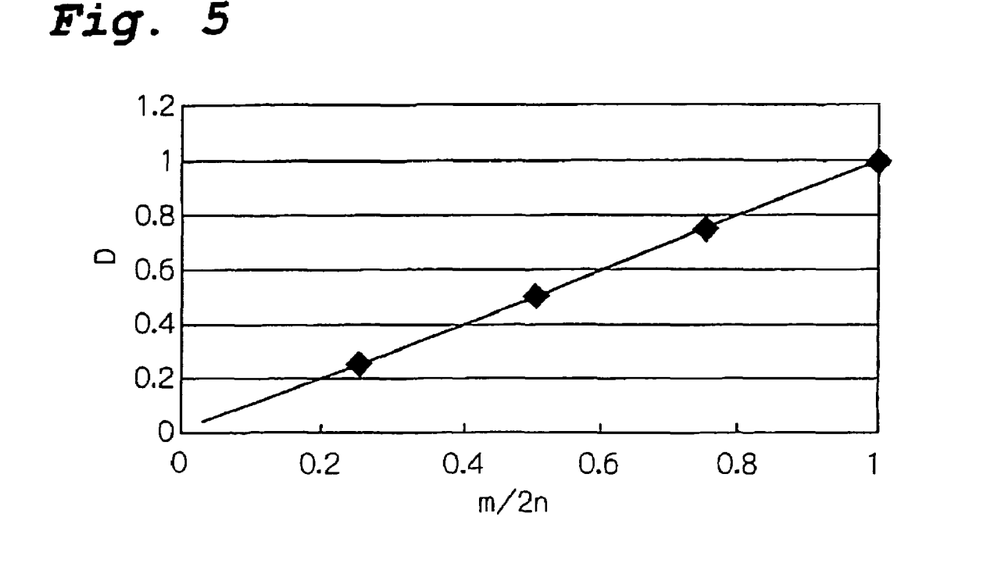
FIG. 5 is a graph showing the effect of the ratio (m/2n) on the peak load ratio for the first stage (the peak load for the first stage for various notch characteristics divided by the peak load for the first stage when notches are not provided) when analysis of axial collapse was carried out by FEM while suitably varying the number of ridge lines having cutouts formed by notches provided in the end portion to which an impact load was applied for a crash energy absorption member formed from a steel sheet with a strength on the order of 590 MPa and a sheet thickness of 1.6 mm and having a length of 220 mm and a transverse cross-sectional shape which was a regular octagon which could be circumscribed by a circle with a diameter of 120 mm.

FIG. 5 is a graph showing the effect of the ratio (m/2n) on the peak load ratio for the first stage (the peak load for the first stage for various notch conditions divided by the peak load for the first stage when notches are not provided) when analysis of axial collapse was carried out by FEM while suitably varying the number of ridge lines having cutouts formed by notches provided in the end portion to which an impact load was applied for a crash energy absorption member formed from a steel sheet with a strength on the order of 590 MPa and a sheet thickness of 1.6 mm and having a length of 220 mm and a transverse cross-sectional shape which was a regular octagon which could be circumscribed by a circle with a diameter of 120 mm. The ordinate D in the graph of FIG. 5 shows the first peak load ratio.

As shown in the graph of FIG. 5, even if notches are provided, the first peak load depends upon the number m of ridge lines remaining with a length L. The second peak load depends upon the total number 2n of ridge lines in the crash energy absorption member. As each of these numbers of ridge lines increases, the deformation load increases.

Therefore, it can be seen that the load differential ΔF which determines the start of operation of the acceleration sensor in the graph of FIG. 2 depends upon (m/2n).

If the ratio (m/2n) exceeds 0.70, ΔF becomes small, so even in cases in which it is not necessary for an air bag to operate due to a light collision, there is the possibility of an erroneous signal being output to cause the air bag to operate. On the other hand, if the ratio (m/2n) is smaller than 0.30, ΔF becomes large, so the energy which can be absorbed by the crash energy absorption member as a whole ends up decreasing.

Thus, in order to impart an optimal ΔF in order to suitably operate an air bag and to realize a high amount of absorbed impact energy which is not seen in the prior art, in the manner of this embodiment, it is important to provide notches 7 and 8 and to prescribe the characteristics of the ridge lines 2 which are cut out by notches 7 and 8 in accordance with the above-described equations (1)-(3).

The notches may be provided such that the notched length h differs for each cutout ridge line 2. For example, in FIG. 6, notches 11 are provided in a step-wise manner in the axial direction of one end portion 4 of a tubular body 6-5 having a transverse cross section which is a decagon. Of the 10 surfaces 3a-3j, some of the surfaces 3a-3d and 3f-3i have a region which extends in the circumferential direction of the tubular body and which is formed in a step-wise manner having two steps in the axial direction.

Figure 6:
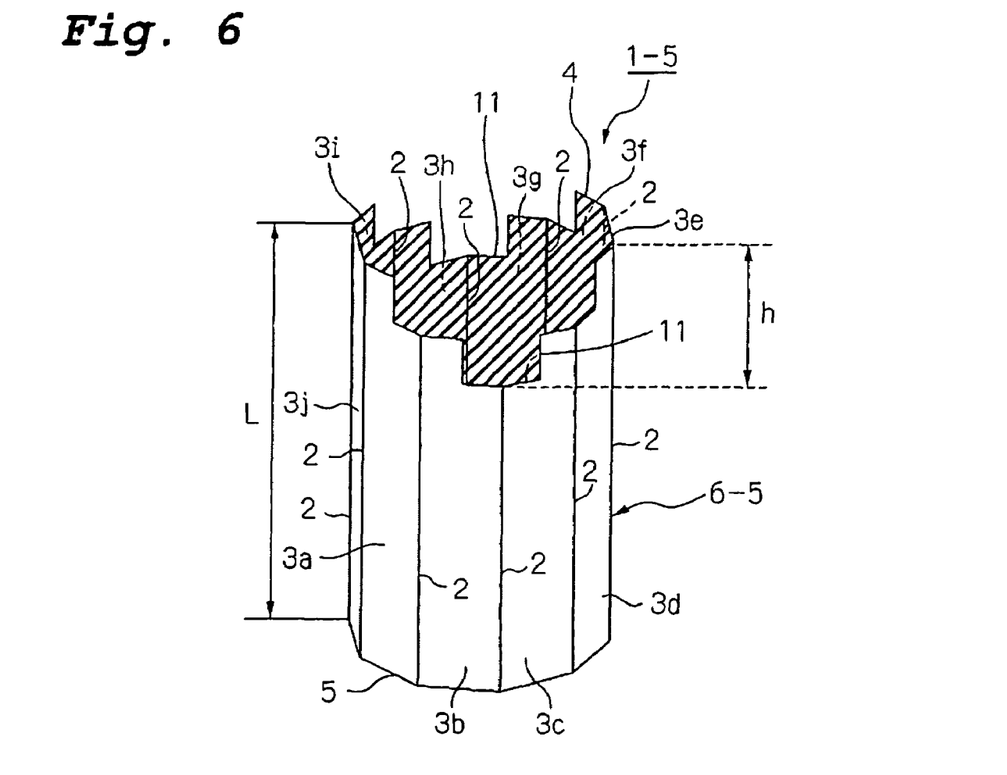
FIG. 6 is an explanatory view showing an example in which notches are provided in a step-wise manner in one end portion of a tubular body having a transverse cross section which is a decagon.

As shown in FIG. 6, by forming the shape of the notches 11 so as to have a cutout shape which intersects the ridge lines 2 at different levels to form a plurality of steps (two steps in the illustrated example), the peak load which is produced can be gradually increased in a plurality of steps.

The relationship between the length of a notch and the load will be explained by again referring to the graph of FIG. 2 which was referred to above.

When an impact load acts on the crash energy absorption member in the axial direction, with the start of deformation, spreading of the cross section of the member due to elastic buckling (deformation out of the surface) and plastic yielding thereof occur. As a result, a peak load develops in the crash energy absorption member.

When the above-mentioned notches are not present, as shown by the dashed line in the graph of FIG. 2, the first peak P1 has a significantly higher value than the second peak P2. Therefore, damage to other members connected to this crash energy absorption member ends up occurring and an excessive change in the acceleration ends up being imparted to passengers, and this leads to an increase in the amount of damage.

In contrast, when prescribed notches having a depth h are provided in the crash energy absorption member, the length in the circumferential direction of the tubular body which receives the impact load which is applied is shortened. Therefore, compared to the case in which notches are not provided, the region in which elastic buckling and plastic yielding occur is reduced, and the length in the circumferential direction of the tubular body which bears the impact load is shortened. Accordingly, as shown by the solid line in the graph of FIG. 2, the value of the first peak load P1 markedly decreases. As a result, damage to other members connected to the crash energy absorption member and an excessive change in acceleration for passengers can be prevented, and an increase in the amount of damage can be prevented.

If notches are formed so as to have a step-wise shape with at least two steps in the axial direction, as shown by the dot and dash line in the graph of FIG. 2, this phenomenon occurs a plurality of times, and a change in load is obtained in a step-wise manner in accordance with the number of steps which are provided in the notches.

In the crash energy absorption members 1-1 and 1-2 in the embodiment shown in FIG. 3, the tubular bodies 6-1 and 6-2 have notches 7 and 8 in symmetric positions, so the tubular bodies 6-1 and 6-2 have shapes which are symmetric with respect to the central axis. Specifically, a portion of two ridge lines 2 which oppose each other across the central axes of tubular bodies 6-1 and 6-2 are preferably cut out by notches 7 and 8, or they both preferably remain intact without being cut out. If the notches 7 and 8 are not present in symmetric positions, bending or the like takes place in the member when collapse occurs in the axial direction by application of an impact load, so stable buckling can no longer be realized.

However, with an offset collision, an impact force is asymmetrically applied to a crash energy absorption member. Therefore, when an offset collision is envisaged, the shape of the notches 7 and 8 may be asymmetric. This is because in an offset collision, there are cases in which not only a collapse force but also a bending stress act on the crash energy absorption members 1-1 and 1-2, and it is thought that in order to absorb this bending stress, a asymmetric shape may be preferred for the crash energy absorption members.

The tubular bodies 6-1 and 6-2 of the crash energy absorption members 1-1 and 1-2 may be manufactured by extrusion, or a blank material in the form of a steel sheet may be given a prescribed transverse cross-sectional shape by press forming. A flange may be provided on the periphery or the inner portion of the tubular bodies 6-1 and 6-2.

The notches 7 and 8 may be formed by cutting out these portions prior to forming the tubular bodies 6-1 and 6-2, or they may be formed at any stage in forming the above-described tubular bodies 6-1 and 6-2. They may also be formed by a suitable means after forming the tubular bodies 6-1 and 6-2.

The crash energy absorption members 1-1 and 1-2 in this embodiment have a transverse cross-sectional shape which is a polygon with 2n sides and at least 6 sides, and a prescribed number of notches 7 and 8 are provided in opposing ridge lines 2, so the initial load can be decreased, and the amount of subsequent energy absorption can be maintained at a high level.

In this manner, with the crash energy absorption members 1-1 and 1-2 of this embodiment, when an impact load is applied, a prescribed amount of shock absorption can be secured by stable bellows-like buckling in the axial direction without an increase in weight due to addition of a partition or an increase in plate thickness and without bending in the axial direction. In addition, according to the crash energy absorption members 1-1 and 1-2 of this embodiment, the impact load which is absorbed by the crash energy absorption members at the time of a collision is divided into two stages and the impact load can be stably controlled with certainty without an increase in weight.

Next, the present invention will be explained more concretely while referring to examples.

EXAMPLE 1

In order to verify the effects of the present invention, the below-described collision test was carried out.

Using a high tensile strength steel sheet with a strength on the order of 590 MPa and a sheet thickness of 1.6 mm as a starting material, press forming was carried out, and then welding was performed to manufacture a crash energy absorption member comprising a tubular body having a transverse cross-sectional shape which was the below-described octagon, hexagon, or quadrangle.

With the crash energy absorption member standing vertically, a weight weighing 200 kgf was dropped in free fall from a height of 11.9 meters onto the crash energy absorption member whereby it collided with the crash energy absorption member at a speed of 55 km/hour.

The axial length of each crash energy absorption member was 220 mm. As a result of buckling in the axial direction, it was collapsed until its length in the axial direction was 80 mm.

In order to verify the effects of notches, (1) the effects on reducing the maximum load of a member in which various notches were provided relative to a member comprising a basic polygon not having notches were investigated, and (2) the efficiency of energy absorption of a member having various notches relative to a member comprising a basic polygon not having notches (crash energy absorbing efficiency (%)) was investigated.

When evaluating the results, the upper limit for the maximum load was made 200 kN from the standpoint of suppressing damage to other members, and the lower limit for the absorbed energy was made 84.0% from the standpoint of securing a high collision performance.

Specimen 1

This specimen had a transverse cross-sectional shape which was a regular octagon which could be circumscribed by a circle with a diameter of 120 mm. It did not have any notches over its entire length.

Specimen 2

This specimen had a transverse cross-sectional shape which was a regular octagon which could be circumscribed by a circle with a diameter of 120 mm. Notches were provided in a region extending from the end to which an impact load was applied for a length of 30 mm. Three continuous ridge lines and three ridge lines symmetrically disposed with respect thereto for a total of six ridge lines were left intact, and a portion of each of the other ridge lines was removed.

Specimen 3

This specimen had a transverse cross-sectional shape which was a regular octagon which could be circumscribed by a circle with a diameter of 120 mm. Notches were provided in a region extending from the end to which an impact load was applied for a length of 30 mm. Two continuous ridge lines and two ridge lines symmetrically disposed with respect thereto for a total of four ridge lines were left intact, and a portion of each of the other ridge lines was removed.

Specimen 4

This specimen had a transverse cross-sectional shape which was a regular octagon which could be circumscribed by a circle with a diameter of 120 mm. Notches were provided in a region extending from the end to which an impact load was applied for a length of 30 mm. A pair of opposing ridge lines for a total of two ridge lines were left intact, and a portion of each of the other ridge lines was removed.

Specimen 5

This specimen had a transverse cross-sectional shape which was a regular octagon which could be circumscribed by a circle with a diameter of 120 mm. Notches were provided in a region extending from the end to which an impact load was applied for a length of 70 mm. Two continuous ridge lines and two ridge lines symmetrically disposed with respect thereto for a total of four ridge lines were left intact, and a portion of each of the other ridge lines was removed.

Specimen 6

This specimen had a transverse cross-sectional shape which was a regular octagon which could be circumscribed by a circle with a diameter of 120 mm. Notches were provided in a region extending from the end to which an impact load was applied for a length of 30 mm. Four continuous ridge lines were left intact, and a portion of each of the other ridge lines was removed.

Specimen 7

This specimen had a transverse cross-sectional shape which was a regular hexagon which could be circumscribed by a circle with a diameter of 120 mm. It did not have notches over the entire length of the member.

Specimen 8

This specimen had a transverse cross-sectional shape which was a regular hexagon which could be circumscribed by a circle with a diameter of 120 mm. Notches were provided in a region extending from the end to which an impact load was applied for a length of 30 mm. Two continuous ridge lines and two ridge lines symmetrically disposed with respect thereto for a total of four ridge lines were left intact, and a portion of each of the other ridge lines was removed.

The test results are compiled in Table 1.

TABLE 1

| No. | Total no. of ridge lines $2n$ | No. of intact ridge lines $m$ | Arrangement of notches | Length h of notches (mm) | Maximum load (kN) | Crash energy absorbing efficiency (%) | Collapsed state |
|---|---|---|---|---|---|---|---|
| 1 | 8 | 8 | — | — | 275 | 100.0 | stable buckling |
| 2 | 8 | 6 | symmetric | 30 | 200 | 86.7 | nearly stable buckling |
| 3 | 8 | 4 | symmetric | 30 | 140 | 91.3 | stable buckling |
| 4 | 8 | 2 | symmetric | 30 | 151* | 80.7 | somewhat unstable buckling |
| 5 | 8 | 4 | symmetric | 70 | 130 | 71.3 | bending of notches |
| 6 | 8 | 4 | asymmetric | 30 | 160 | 84.0 | bending |
| 7 | 6 | 6 | — | — | 247 | 100.0 | stable buckling |

TABLE 1-continued

| No. | Total no. of ridge lines 2n | No. of intact ridge lines m | Arrangement of notches | Length h of notches (mm) | Maximum load (kN) | Crash energy absorbing efficiency (%) | Collapsed state |
|---|---|---|---|---|---|---|---|
| 8 | 6 | 4 | symmetric | 30 | 188 | 85.7 | stable buckling |

Note:
The maximum load indicates the initial maximum load in the initial period of collapse. However, *indicates the 2nd peak load which was produced after all the notches collapsed.

The deformation in axial collapse of the crash energy absorption member, which is the deformation at the time of a collision, occurs in the form of a combination of plastic buckling deformation of the ridge lines and bending deformation of the flat portions between ridge lines, and at the same time it absorbs impact energy In other words, plastic buckling, which is a plastic instability problem, ideally repeatedly occurs over the entire length of the crash energy absorption member in the axial direction.

In the column for "collapsed state" in Table 1, (i) "stable buckling" indicates that plastic buckling repeatedly occurred over the entirety of the crash energy absorption member in the axial direction, and that a large number of fine buckling wrinkles remaining after collapse were stacked on each other, (ii) "unstable buckling" indicates that the number of times that plastic buckling occurred was small, the size of each wrinkle remaining after a collision was large, and as a result, compared to the case for category (i), the load fluctuation was large and the energy absorption efficiency was low, and (iii) "bending" indicates that bending and a reduction in stroke occurred over the entirety of the crash energy absorption member in the axial direction, so the number of occurrences of the above-described plastic buckling was smaller than in the case of the above-described category (ii), and the efficiency of energy absorption was at the lowest level.

From the results shown in Table 1, it can be seen that buckling behavior is made stable by symmetric arrangement of notches.

As shown in Table 1, the initial load of crash energy absorption members having a basic polygonal shape which was an octagon or a hexagon decreased when notches were provided. In addition, as seen from the results of Specimens Nos. 1-3, the initial load decreases as the number of cutout ridge lines increases. However, for Specimen No. 4, for which the number of intact ridge lines was 2, which was outside the range of the present invention, although the initial load decreased, the second peak load which occurred after the collapse of the notches became high, the impact absorbing ability decreased, and sufficient collision performance could not be secured.

For Specimen No. 5 for which the length of the notches was 70 mm, which was outside the range of the present invention, although the initial load was low, large bending developed in the notches, and the crash energy absorbing performance decreased to 71.3% as compared to the case when notches were not provided.

With Specimen No. 6 which had asymmetric notches, bending developed at the time of collapse, so it could be considered undesirable from the standpoint of securing the performance of a single crash energy absorption member. However, as stated above, in the case where an offset collision is envisaged, the impact force applied to a crash energy absorption member is asymmetric, so the shape of notches may be deliberately arranged in an asymmetric shape.

For Specimens No. 7 and No. 8 for which the basic polygon was a hexagon, in the same manner as when the basic polygon was an octagon, when the notches satisfied the conditions prescribed by the present invention, good effects were obtained with respect to the effect of decreasing the initial load and crash energy absorbing performance.

Figure 7:
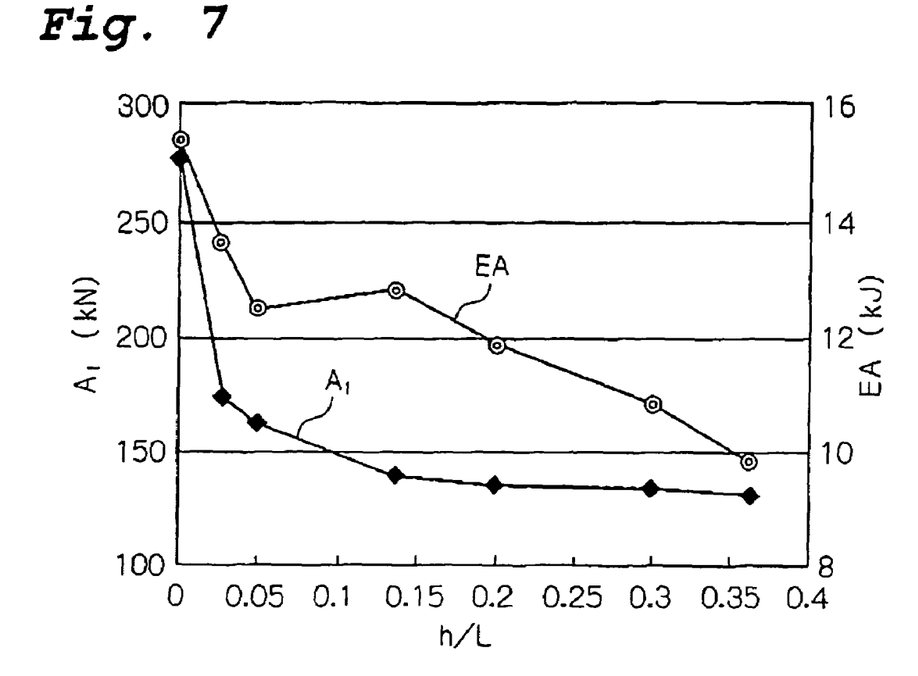
FIG. 7 is a graph obtained by plotting the initial load $A_1$ and the absorbed energy EA when the amount of collapse was 140 mm for Specimen 1 of an example of the present invention when the ratio (h/L) of the length h of a notch to the length L of the member was varied.

FIG. 7 is a graph obtained by plotting the initial load $A_1$ and the absorbed energy EA at the time of a collapse by 140 mm for Specimen 3 of this example when the ratio (h/L) of the length h of the notches to the length L of the member was varied.

From the graph shown in FIG. 7, it can be seen that the ratio (h/L) is preferably at most 0.30 and preferably at least 0.03. From the same standpoint, the ratio (h/L) is more preferably at least 0.05 and at most 0.20.

EXAMPLE 2

In order to verify the effects of the present invention, the below-described test was carried out.

Figure 8:
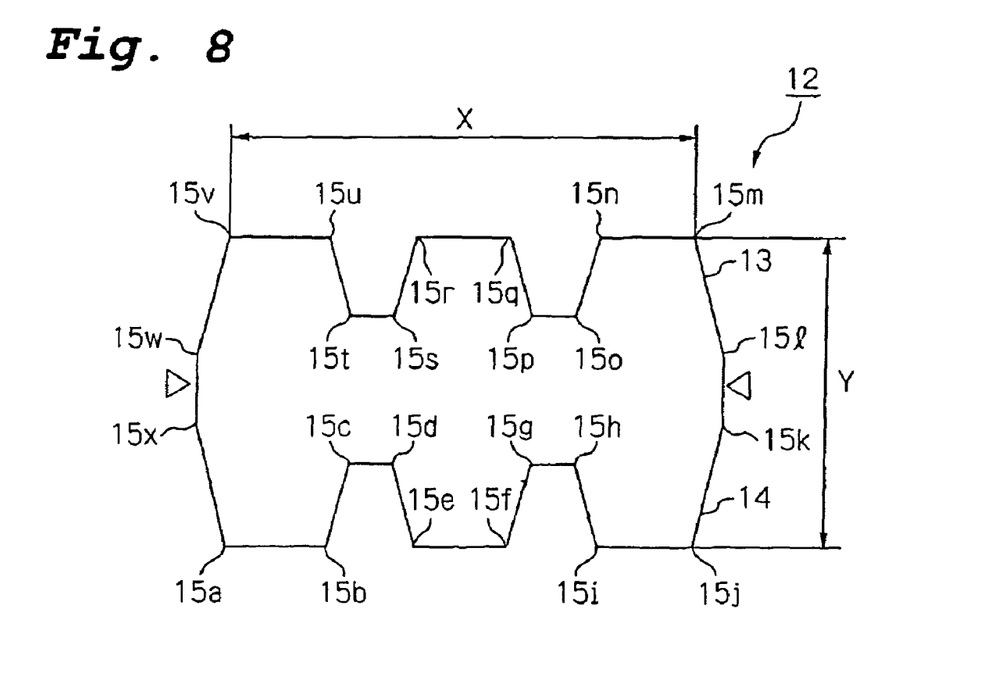
FIG. 8 is an explanatory view showing the base shape of a crash energy absorption member used for evaluating properties.

Using a steel sheet with a strength on the order of 590 MPa and a sheet thickness of 1.6 mm as a blank material, press forming was carried out on the steel sheet to prepare a crash energy absorption member 12 having the transverse cross-sectional shape shown in FIG. 8, in which X was 160 mm and Y was 80 mm.

This crash energy absorption member 12 was assembled by welding two press-formed members 13 and 14 by spot welding at the locations shown by triangles in the figure.

As a basis for evaluating the performance of a crash energy absorption member 12 having the transverse cross-sectional shape shown in FIG. 8, notches were provided by symmetrically cutting out 4, 8, 12, 16, or 20 ridge lines of ridge lines 15a-15x. The load properties and the absorbed energy were then investigated at the first peak load and the second peak load.

The prescribed number of ridge lines 15a-15x which opposed symmetrically were partially cut out with h=20 mm in order of distance from the center of the cross section starting from the ridge lines which were located closest to the center. In the case in which 20 ridge lines were cut out, the cross-sectional shape was such that ridge lines 15a, 15j, 15m, and 15v located at the four corners of the transverse cross section were left intact. The length of the crash energy absorption member 12 was 200 mm, and the absorbed energy EA was evaluated as the energy absorbed by deformation up to 70% of the overall length of the crash energy absorption member 12.

An impact test was carried out in which the crash energy absorption member 12 was vertically disposed and a weight weighing 200 kgf was dropped in free fall from a height of 11.9 meters to collide with the crash energy absorption member at a speed of 55 km/hour. The test results are compiled in Table 2.

TABLE 2

| No. | Cutting conditions "Number of ridge lines cut" | m | m/2n | 1st load (kN) | 2nd load (kN) | ΔF (kN) (2nd − 1st) | EA (kJ) |
|---|---|---|---|---|---|---|---|
| 1C | 0 (base shape) | 24 | 0.000 | 469.5 | 343.6 | −125.9 | 30.24 |
| 2C | 4 | 20 | 0.883 | 391.3 | 337.3 | −54.0 | 29.84 |
| 3C | 8 | 16 | 0.667 | 313.8 | 329.8 | 16.0 | 28.15 |
| 4C | 12 | 12 | 0.500 | 234.8 | 326.4 | 91.6 | 26.41 |
| 5C | 16 | 8 | 0.333 | 156.5 | 341.7 | 185.2 | 25.73 |
| 6C | 20 | 4 | 0.167 | 78.3 | 319.6 | 241.3 | 22.19 |

As a result of cutting out the ridge lines so as to provide notches, the first peak load decreased, and a load difference necessary for operating an acceleration sensor was obtained with Specimens Nos. 3C, 4C, and 5C.

Specimens Nos. 1C and 2C had a first peak load which was higher than the second peak load, so the desired load control could not be achieved.

Although Specimen No. 6C had a high load difference ΔF, the absorbed energy EA was low, so a high level of absorbed impact energy was not obtained.

Thus, Specimens Nos. 3C, 4C, and 5C could realize an optimal load difference ΔF for suitable operation of an acceleration sensor and high energy absorption.

INDUSTRIAL APPLICABILITY

According to the present invention, a crash energy absorption member is provided which can decrease the initial load and which can secure a sufficient amount of shock absorption by stable buckling behavior without having a crushing bead.

The invention claimed is:

1. A crash energy absorption member comprising a tubular body which has a length L and a polygonal transverse cross-sectional shape, the tubular body formed by a plurality of sidewalls having opposing ends, each sidewall having an exposed outer surface which connects with adjacent sidewall outer surfaces to form a continuous crash energy absorption member outer peripheral surface, the sidewalls and opposing ends forming a unitary tubular body with inside surfaces of the joined sidewalls forming an unrestricted interior space within the tubular body, the tubular body including 2 n corners (wherein n is a natural number greater than or equal to 3) due to having 2 n ridge lines and 2 n surfaces partitioned by these 2 n ridge lines and which absorbs impact energy by buckling when an impact load is applied to one end of the member in the axial direction towards the other end thereof, characterized in that some of the 2 n ridge lines exist only in a region which extends from a position spaced by a distance h in the axial direction from the one end to the other end, the absorption member having a number of ridge lines m having a length L, and the following equations are satisfied:

$$h \leq L \times 0.30 \qquad (1)$$

$$4 \leq m \leq 2 \times (n-1) \qquad (2).$$

2. A crash energy absorption member as set forth in claim 1 wherein the following Equation (3) is satisfied:

$$h \geq L \times 0.30 \qquad (3).$$

3. A crash energy absorption member as set forth in claim 1 wherein the following Equation (4) is satisfied:

$$0.30 \leq m/2 n \leq 0.70 \qquad (4).$$

4. A crash energy absorption member as set forth in claim 1 wherein the region is formed in a step-wise manner by at least two steps in the axial direction.

5. A crash energy absorption member as set forth in claim 1 wherein the tubular body has a shape which is symmetric with respect to the central axis of the tubular body.

6. A crash energy absorption member as set forth in claim 2 wherein the following Equation (4) is satisfied:

$$0.30 \leq m/2 n \leq 0.70 \qquad (4).$$

7. A crash energy absorption member as set forth in claim 2 wherein the region is formed in a step-wise manner by at least two steps in the axial direction.

8. A crash energy absorption member as set forth in claim 3 wherein the region is formed in a step-wise manner by at least two steps in the axial direction.

9. A crash energy absorption member as set forth in claim 2 wherein the tubular body has a shape which is symmetric with respect to the central axis of the tubular body.

10. A crash energy absorption member as set forth in claim 3 wherein the tubular body has a shape which is symmetric with respect to the central axis of the tubular body.

11. A crash energy absorption member as set forth in claim 4 wherein the tubular body has a shape which is symmetric with respect to the central axis of the tubular body.

* * * * *